T. BOBERG & N. TESTRUP.
UTILIZATION OF KELP AND SIMILAR AQUATIC PLANTS.
APPLICATION FILED DEC. 18, 1914.
1,177,375.
Patented Mar. 28, 1916.
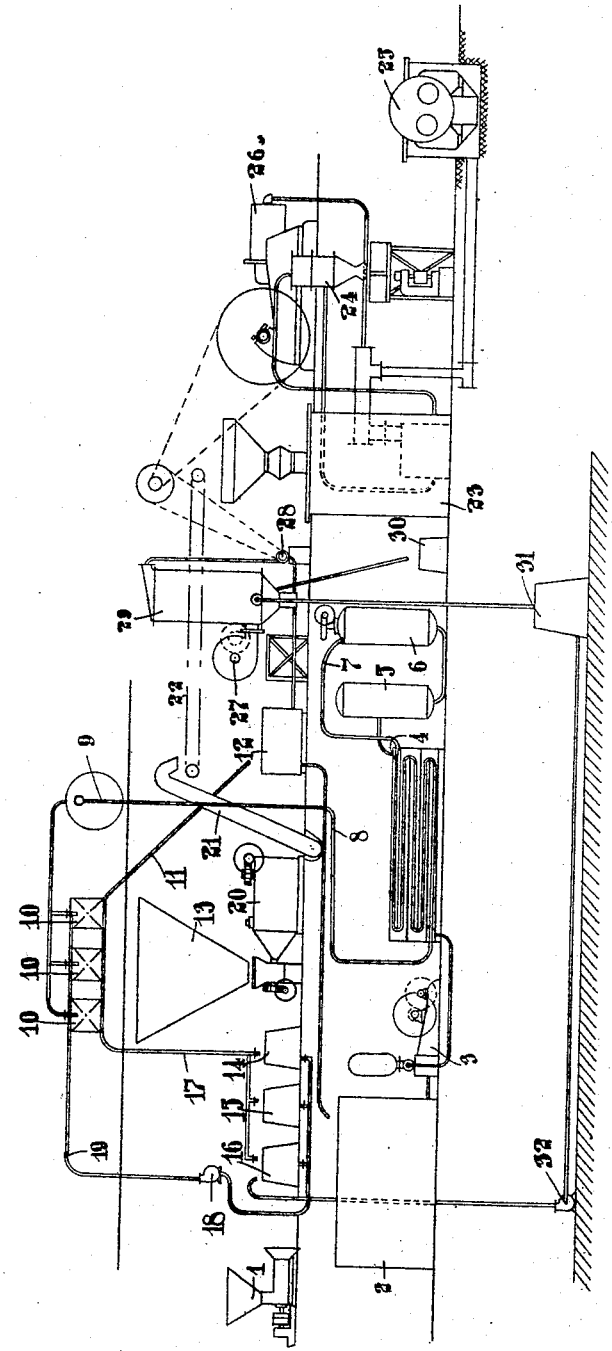
INVENTORS
Teofron Boberg
Nils Testrup
BY
ATTORNEYS

UNITED STATES PATENT OFFICE.

TEOFRON BOBERG AND NILS TESTRUP, OF LONDON, ENGLAND, ASSIGNORS TO TECHNO-CHEMICAL LABORATORIES LIMITED, OF LONDON, ENGLAND.

UTILIZATION OF KELP AND SIMILAR AQUATIC PLANTS.

1,177,375.  Specification of Letters Patent.  Patented Mar. 28, 1916.

Application filed December 18, 1914. Serial No. 877,978.

*To all whom it may concern:*

Be it known that we, TEOFRON BOBERG, a subject of the King of Sweden, and residing at Fairlawn, Clarence Road, Clapham Park, London, S. W., England, and NILS TESTRUP, a subject of the King of Great Britain and Ireland, and residing at 3 Dean Farrar street, London, S. W., England, have invented certain new and useful Improvements in and Relating to the Utilization of Kelp and Similar Aquatic Plants, of which the following is a specification.

This invention relates to the utilization of kelp and similar aquatic plants for the recovery of sodium and potassium salts or iodin or both therefrom and is particularly applicable to the treatment of giant kelps of the type *Nereocystis Luetkena*, *Macrocystis pyrifera* and *Pelagophyous porra* (see *Journal Franklin Institute* 1913, Vol. CLXXVI, 4), in which the alkali salts (exceeding in some cases 35%) are present in amount to represent a value greater even than that of the iodin.

We have ascertained that heating of the wet weed in a pulped state to an elevated temperature without permitting evaporation will secure destruction of the slimy matter which binds the moisture (and its dissolved salts) in the plant and will permit of expressing this liquid from the plant with relative ease after such a treatment. As a result the method proposed by Ekenberg of rendering the water expressible from peat (see *Journal of the Iron and Steel Institute* 1909) becomes available for this purpose. In carrying out the present invention therefore the kelp or the like is first reduced to a watery pulp, this pulp then forced under pressure through a heater and heat recuperator in such a manner as to destroy slimy water binding matters without permitting evaporation and without undue loss of heat and the treated material then pressed to separate salt-containing solution while the solid is preferably further dried to render it available as fuel for the heat needs of the process. For this purpose methods and apparatus such as are proposed in British patent specifications Nos. 17610 of 1911, 17427 of 1912 and 24639 of 1912, for the treatment of peat may with advantage be employed.

As an instance of the character of the change which heat treatment can produce the following example may be given: A kelp which in the form of a pulp of some 90 per cent. water content contained 35 per cent. of alkali salts per 100 parts of dry solids, could be easily pressed to yield a firm press cake, after having been heated to a temperature of about 170° C., or upward for a period of about twenty minutes. Some 25 parts of the alkali salts were now in the liquid while the remaining 10 parts were retained by the cake. Of the iodin some 90% was in the effluent and of the nitrogen of the kelp of which this specimen contained some 1.2% calculated dry one-third was in the effluent and two-thirds in the press cake. Some 10% of the organic matter of the original material had also become dissolved in the effluent. It will be seen, therefore, that in this particular instance the material behaved in much the same way and presents the same circumstances as an average peat when considered from the standpoint of heat treatment as by wet carbonization.

In carrying out this invention in one form, the kelp, for example one of the giant kelps above referred to, is gathered in any suitable way (see, for instance, *Journal of the Franklin Institute*, 1913, 4, 347) and reduced to a condition which will render it suitable for pumping through tubular or other digesters and heat recuperators. The highly gelatinous condition of the material and its massive character present in this case certain special features it being, for example, desirable to reduce as far as possible the size of the particles of the pulp to such an extent that the time factor of change of condition is not unduly high (although particles several millimeters in diameter were completely altered by the time and temperature instanced) and it being further desirable to reduce as far as convenient the inclusion of any large amount of air between the gelatinous particles which would interfere with heat transfer within the mass and cause actual loss of heat by evaporation of water to saturate this included air. The inclusion of air may, in a large measure, be reduced by subjecting the pulped mass while preferably in a relatively thin layer to a partial vacuum or by conducting the pulping under water or by both measures. Apparently, a content of insoluble matter of some 6-10% will, in most instances, yield a more or less fluid pulp with the macerated material. The pulp leaving the heater and after recuperation of its heat to the desired extent in the customary manner can be subjected to pressure filtration and a portion of the effluent returned to be used in diluting a further quantity of raw pulp while the balance can be treated for recovery of its salts and the like in any convenient manner. The press cake may be washed to reduce the content of fusible salts in the mass and in which case the wash waters may be used as diluting water for the pulp which can then be further dried by pressure in a band or like mechanical press or by waste heat drying (as by suspending it in a finely divided state in a current of flue gases) and the material gasified with by-product recovery or subjected to low temperature distillation to yield by-products, fuel gas, and valuable residual char, suitable *inter alia* as filtering and clarifying agent. The liquid expressed is preferably concentrated in an evaporator of the kind described in British Patents Nos. 12462 of 1911 and 22670 of 1911, motive power for which is wholly or partly derived, for instance, from the balance of fuel available from the gasification or destructive distillation. The product may be either calcined to remove the organic matter and then in any suitable way separated into its desired constituents, or the concentrated syrup or dried residue may be incorporated with the fuel in the gasifier or retort and after its organic matter has been so utilized to yield up a corresponding amount of heat and to yield up nitrogen which has passed into the effluent with it the salts can be recovered by lixiviation of the ashes or char.

It will be understood that according to the particular constituents of the aquatic plants treated or their relative or absolute amounts, or its organic nature and similar factors the process can be carried out in a large number of different ways of which the above are only examples.

The accompanying drawing shows one way in which the invention can be carried into effect.

The wet weed is pulped in a pulper 1 and falls thence into a storage tank 2. A pump 3 draws it therefrom and forces it through a heat recuperator 4, heater 5, vessel 6 in which the necessary time for completion of the change is given it, pipe 7, back through the regenerator 4 and by pipe 8 into a receiver 9 whence it passes into one or other of the filter presses 10, the expressed liquid passing by pipe 11 to the tank 12 and the residual solids on the opening of the press into the press-cake bunker 13. Before opening the press the cake is washed, the washings as they diminish in strength being caught respectively in tanks 14 and 15 to which they are led by pipe 17, the necessary washing liquid is raised to the presses from any of the tanks 14, 15 and 16 by the pump 18 and pipe 19. The press-cakes from the bunker 13 are pressed further in a powerful band press 20, elevated therefrom by an elevator 21 and carried by a conveyer 22 to a by-product-recovery gas producer 23 the sulfate liquor from which is concentrated in evaporator 24 and the gas from which is used in part to heat steam raising boiler 25 and in part to operate the gas engine 26 driving the compressor 27 and film distributer pump 28 of the evaporator 29 which concentrates the liquid from tank 12 and discharges concentrate into tank 30 and distilled water into tank 31, whence the latter can by pump 32 be raised to tank 16 for use in press-cake washing.

Having now described our invention what we claim as new and desire to secure by Letters Patent is:—

1. In the recovery of sodium, potassium salts or iodin from aquatic plants the method consisting in heating the wet plant to a temperature above the boiling point of the water and under such pressure as to prevent evaporation, discontinuing said heating when the water binding properties of the material have been destroyed, cooling the heated mass, expressing from it the aqueous portions and separating the desired chemical product from the aqueous portion; as set forth.

2. The method of utilizing aquatic plants consisting in macerating the wet plant to a watery pulp, continuously forcing said plup through a heating zone and raising it therein to a temperature above the boiling point of the water while simultaneously subjecting it to pressure sufficient to restrain ebullition, causing the heated mass, so soon as its water binding properties have been substantially destroyed by said heating, to impart its heat to cooler pulp awaiting treatment, pressing the treated cooled pulp, collecting the expressed liquid and subjecting the same to treatment to separate dissolved inorganic matters; as set forth.

3. A process for obtaining alkali salts and iodin including macerating giant kelp and while avoiding undue inclusion of air in the resulting pulp, heating the pulp while containing some 90% of water to a temperature of about 170° C. for some 20 minutes under a pressure sufficient to prevent evaporation, cooling the treated material to a temperature of about 30° C. and removing aqueous matter by filter pressing.

4. In the recovery of valuable chemical substances from aquatic plants, reducing the latter while wet to the condition of a pulp by macerating them under water, destroying the slimy water binding matters thereof by digestion at an elevated temperature and under pressure, expressing the liberated aqueous matter, and admixing expressed aqueous matter with untreated material about to be digested.

5. In the recovery of valuable chemical substances from aquatic plants, destroying the water binding matters thereof by digestion of the wet material, thereafter expressing the liberated aqueous matter, evaporating a portion of the expressed aqueous matter for the obtaining of salts therefrom and admixing a further portion of the expressed aqueous matter with a succeeding quantity of the untreated material about to be digested; as set forth.

In testimony whereof we have signed our names to this specification in the presence of two subscribing witnesses.

TEOFRON BOBERG.
NILS TESTRUP.

Witnesses:
BERTRAM H. MATTHEWS,
WILLIAM H. BIRD.

Copies of this patent may be obtained for five cents each, by addressing the "Commissioner of Patents, Washington, D. C."